United States Patent
Kari

(10) Patent No.: US 6,563,825 B1
(45) Date of Patent: May 13, 2003

(54) PACKET TRANSMISSION IN TELECOMMUNICATION NETWORK

(75) Inventor: Hannu Kari, Veikkola (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/308,110

(22) PCT Filed: Nov. 13, 1997

(86) PCT No.: PCT/FI97/00693

§ 371 (c)(1),
(2), (4) Date: May 13, 1999

(87) PCT Pub. No.: WO98/23119

PCT Pub. Date: May 28, 1998

(30) Foreign Application Priority Data

Nov. 15, 1996 (FI) .................................................. 964598

(51) Int. Cl.$^7$ .............................................. H04L 12/28
(52) U.S. Cl. ...................................................... 370/394
(58) Field of Search ................................ 370/328, 329, 370/331, 332, 335, 336, 342, 345, 347, 349, 503, 350, 401, 510, 512, 394, 393, 392, 395.21; 455/422, 432, 433, 440

(56) References Cited

U.S. PATENT DOCUMENTS

| | | | |
|---|---|---|---|
| 5,530,693 A | | 6/1996 | Averbuch et al. |
| 5,533,026 A | * | 7/1996 | Ahmadi et al. ............. 370/338 |
| 5,548,586 A | | 8/1996 | Kito et al. |
| 5,610,595 A | | 3/1997 | Garrabrant et al. |
| 5,737,328 A | * | 4/1998 | Norman et al. ............. 370/331 |
| 5,889,770 A | * | 3/1999 | Jokiaho et al. ............. 370/337 |
| 6,081,723 A | * | 6/2000 | Mademann ................. 370/338 |

FOREIGN PATENT DOCUMENTS

| | | |
|---|---|---|
| EP | 0 328 100 | 8/1989 |
| EP | 0 777 395 | 6/1997 |
| EP | 0 798 943 | 10/1997 |
| WO | WO 97/25802 | 7/1997 |
| WO | WO 97/33403 | 9/1997 |

OTHER PUBLICATIONS

Copy of International Search Report for PCT/FI97/00693.
ETSI TC–TR–GSM 02.60, "Digital cellular telecommunications system (Phase 2+); General Packet Radio Service (SPRS); Service description Stage 1 (GSM 02.60", pp. 1–47, Feb. 1997.
ETSI TC–TR–GSM 03.60, Digital cellular telecommunication system (Phase 2+); General Packet Radio Service (GPRS); Service Description; Stage 2; (GSM 03.60), pp. 1–73, Feb. 27, 1997.

* cited by examiner

Primary Examiner—Dang Ton
(74) Attorney, Agent, or Firm—Squire, Sanders & Dempsey, LLP

(57) ABSTRACT

In a packet radio network, the position updates of a mobile station are transmitted in UI frames, whose priority is higher than that of I frames which transmit payload traffic and whose header comprises the cell for identifier of the mobile station. If the mobile station moves from a first cell to a second, an SGSN node can receive the I frame later than the UI frame giving the location update; the SGSN node thus incorrectly concluding that the mobile station has returned to the first cell. The incorrect location update is prevented in such a way that: (i) the transmitter or a following network element provides at least some frames with a sequence identifier, which is not dependent on the frame type; and (ii) at least one network element receiving the frame observes the sequence identifier of the frames and concludes that the location and/or routing information of the frame is incorrect, if the sequence identifier shows that the frame is older than a previously received frame.

20 Claims, 2 Drawing Sheets

PACKET TRANSMISSION IN TELECOMMUNICATION NETWORK

BACKGROUND OF THE INVENTION

1. Field of the Invention

The invention relates to a method of transmitting frames, i.e. packets, in a telecommunication network and an equipment for implementing the method.

2. Description of the Related Art

The invention is explained in an exemplary manner in connection with a mobile communication system, but it can also be implemented in other kinds of telecommunication systems. FIG. 1 shows the parts of the mobile communication system that are essential for understanding the invention. Mobile Stations MS communicate with Base Transceiver Stations BTS1 and BTS2 over an air interface Um. The base transceiver stations are controlled by Base Station Controllers BSC associated with Mobile Switching Centres MSC. A subsystem controlled by a base station controller BSC, including the Base Transceiver Stations BTS controlled by the system, is called a Base Station Subsystem BSS. The interface between the exchange MSC and the base station subsystem BSS is called an A interface. The part of the mobile system that is on the MSC side of the A interface is called a Network Subsystem NSS. The interface between the base station controller BSC and the base transceiver station BTS, in turn, is called an Abis interface. The mobile switching centre MSC connects incoming and outgoing calls. It has similar functions as an exchange of a Public Switched Telephone Network PSTN. In addition to these, it also performs functions that are typical of mobile communication only, such as subscriber location management, in co-operation with the subscriber registers of the network, which in FIG. 1 are represented by a home location register HLR and a visitor location register VLR. The location of a mobile station MS is maintained in the visitor location register VLR with an accuracy of a Location Area LA. The size of the location area is one or more cells. When a mobile station MS observes that the location area has changed, it transmits a location update message to the network, according to which the new location area LA1, LA2 of the mobile station MS is updated in the visitor location register VLR, in whose area the mobile station MS is.

A conventional radio connection used in digital mobile communication systems is a circuit switched connection, which means that resources allocated to a subscriber are reserved for the connection concerned for the entire duration of the call. A General Packet Radio Service GPRS is a new service designed for digital mobile communication systems, such as the GSM system. The packet radio service is described in ETSI specifications TC-TR-GSM 02.60 and 03.60. The packet radio service makes it possible to offer the user of a mobile station MS a packet-form radio connection effectively utilizing radio resources. On a packet switched connection, radio resources are reserved only when speech or data is to be sent. The speech or data is collected in packets of a certain length. When a packet like this has been transmitted over the air interface Um, and the transmitting party does not immediately have a new packet to send, the radio resource can be released to other subscribers.

The system of FIG. 1 comprises a separate Serving GPRS Support Node or SGSN, which controls the operation of the packet data service on the network side. The control comprises, for example, logging of the mobile station on and off the system, location updating of the mobile station, and routing of the data packets to the correct destination. In the present application, 'data' is interpreted widely to mean any information transmitted in a digital mobile system, for example speech encoded in digital form, data transmission between computers, or telefax data. An SGSN node can be located in connection with a base transceiver station BTS, a base station controller BSC or a mobile switching centre MSC, or it may be separate from them. The interface between an SGSN node and a base station controller BSC is called a Gb-interface.

Information, such as control signalling and speech or other data, is transmitted in the packet network by GPRS frames. Each frame F comprises a header 1 and a data part 2. The frames can be divided into two groups, or types, depending on whether they transport payload traffic to/from the user or signalling apart from the payload, the signalling being used to transmit control messages between network elements. Payload traffic is transported in Information Frames I and signalling in Unacknowledged Information Frames UI. Both I frames and UI frames comprise a cell ID, or else a network element, for example a base station located on the route of the frame, can insert the cell ID from which the SGSN node can conclude from which cell the frame was transmitted. The I frames comprise an internal numbering used in retransmitting I frames and in flow control, but the UI frames do not have such a numbering.

Problems in location updating may occur in a packet radio network complying with the above ETSI specifications. A problem may occur e.g. in the following situation (reference is made to FIG. 2). In step 2-1 the mobile station MS transmits data in a normal I frame, where the cell ID comprises an identifier of cell C1. Let us assume that the BSS (or another intermediate network element) does not have time to immediately transmit all low-priority frames but stores such frames in a queue. In step 2-2 the mobile station MS moves from cell C1 to cell C2. In step 2-3 the mobile station MS informs about the location update by transmitting a UI frame concerning the matter. In a BSS queue, a UI frame bypasses an I frame as the priority of the UI frame is higher. In step 2-4 the BSS (having the I frame received in step 2-1 in its queue) consequently transmits to the SGSN node the UI frame, which the mobile station MS transmitted in step 2-3. On the basis of this information the SGSN node concludes that the mobile station MS has moved to cell C2. In step 2-5 the SGSN node transmits to cell C2 data D addressed to the mobile station MS. In step 2-6 the BSS transmits the I frame it received in step 2-1. Based on this information, the SGSN node (incorrectly) concludes that the mobile station MS has returned to cell C1. In step 2-7, the SGSN node again transmits data D addressed to the mobile station. The latest information received by the SGSN node concerning the location of the mobile station MS is based on the I frame received in step 2-6, indicating that the mobile station is located in cell C1. Based on this information, the SGSN node transmits data addressed to the mobile station to cell C1, where the mobile station MS is, however, no longer located. This causes unnecessary delays and use of the resources of the network and the air interface, as the mobile station MS will, however, not be found in cell C1. Instead, it must be searched for and the data must be retransmitted until the mobile station is finally found in cell C2.

SUMMARY OF THE INVENTION

An object of the invention is thus to develop a method and an equipment for implementing the method in order to solve the problems of the above location update. The object of the invention is achieved with a method and a system which are characterized by what is disclosed in the characterizing part of the independent claims. The preferred embodiments of the invention are disclosed in the dependent claims.

The idea of the invention is that a general numbering sequence covering both the I and UI frames is inserted into the frames. As a result, the receiver is able to conclude the correct order of frames from the frame number and then avoid any incorrect location updates of prior art packet networks.

In the following, the invention will be described in greater detail in connection with the preferred embodiments with reference to the accompanying drawings, in which

DETAILED DESCRIPTION OF THE INVENTION

Figure 1:
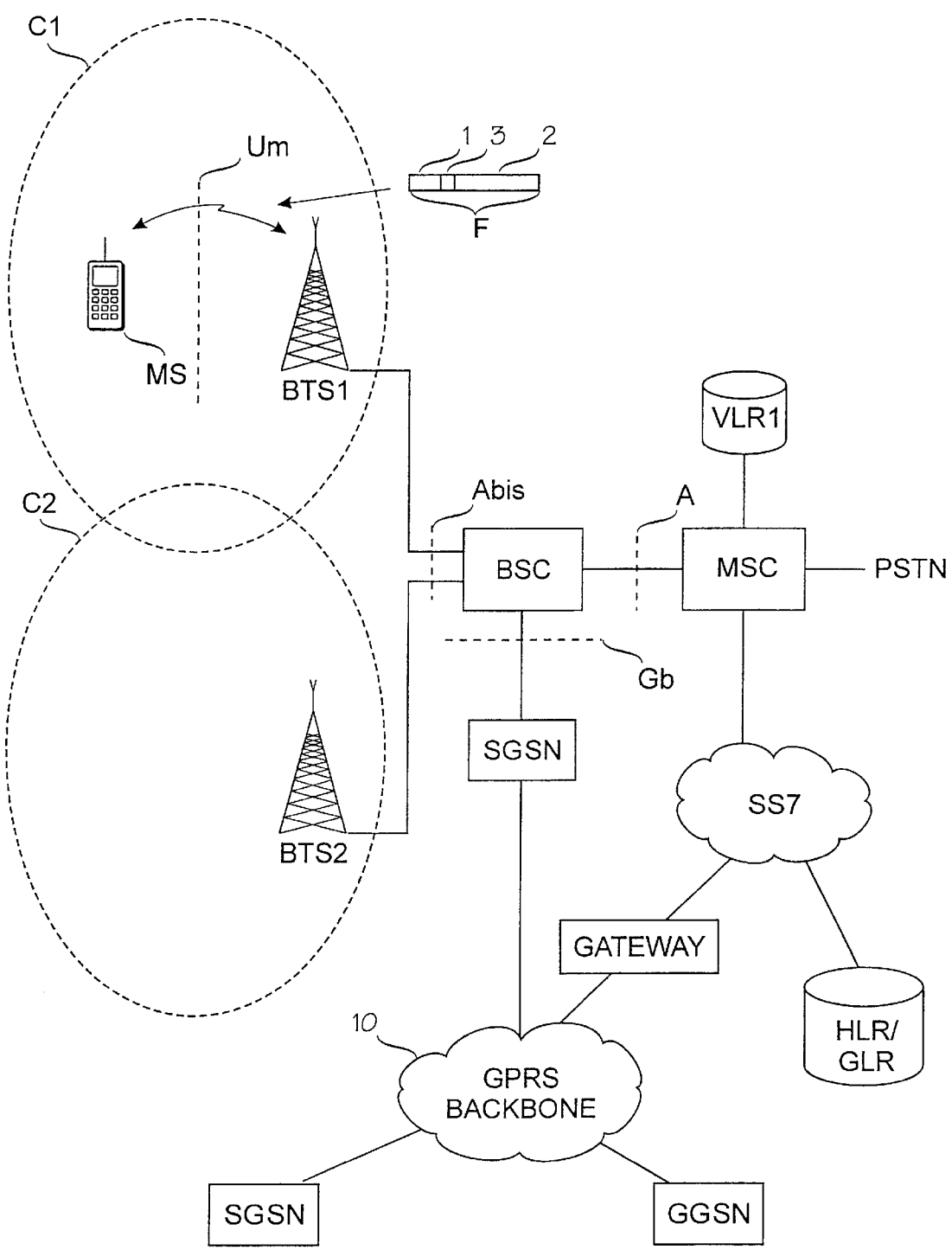
FIG. 1 shows the parts of the mobile communication system that are essential for understanding the invention.

Referring to FIG. 1, in accordance with the invention, a general or "global" frame number denoted by reference 3 in FIG. 1 is added to the frames F. The general numbering of the frames of the invention is preferably connection-specific, i.e. the numbering starts anew at the beginning of a connection. The node receiving the frame, such as an SGSN node, maintains information about the largest frame number 3 of the connection concerned. If the frame number 3 of the received frame is smaller than the number of an earlier received frame, the SGSN node does not react to the cell information on such a frame but ignores it.

Figure 2:
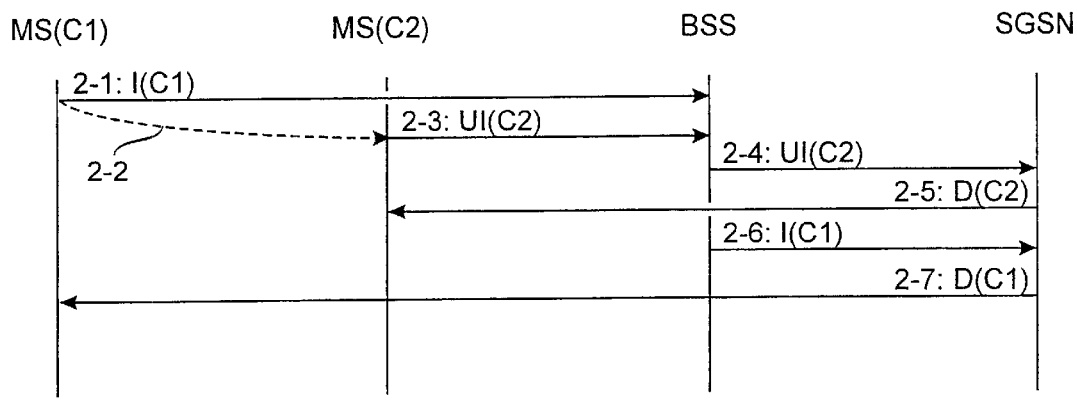
FIG. 2 shows a signalling diagram illustrating the problem.
Figure 3:
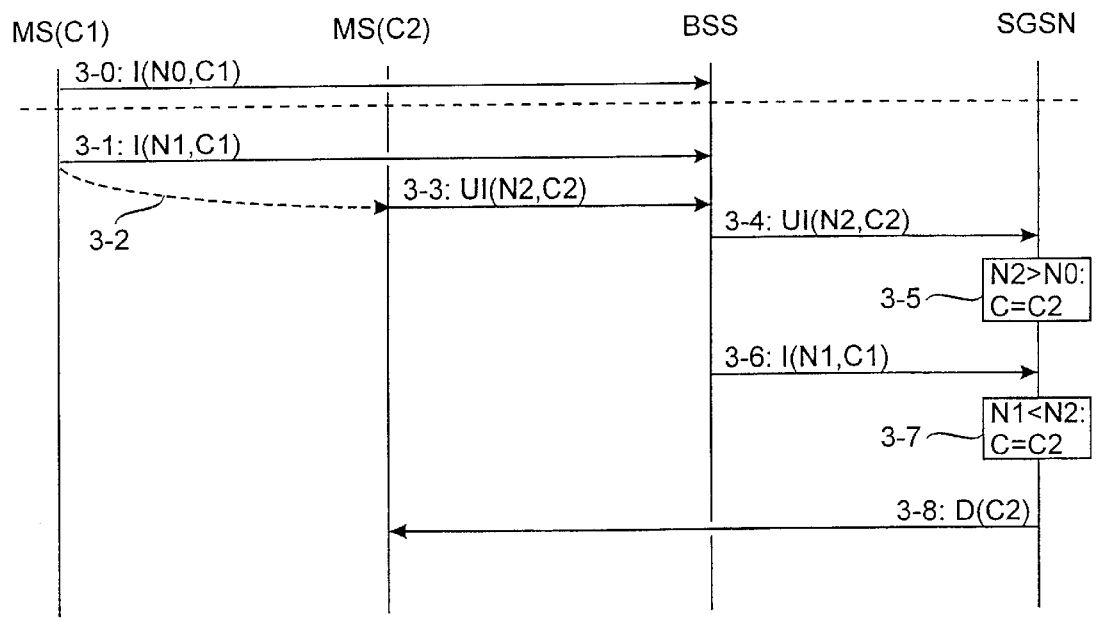
FIG. 3 shows a signalling diagram illustrating the invention.

FIG. 3 describes this process in greater detail. Step 3-0 comprises all traffic between the mobile station MS and the SGSN node before an inter-cell handover and location update of the mobile station. The latest frame transmitted before the inter-cell handover is numbered N0, this frame indicating that the mobile station is located in cell C1. In step 3-1 the mobile station MS transmits data to the BSS network in normal I frames, in which the cell ID comprises the ID of a new cell and the frame is numbered N1. In the BSS, the frame ends up in a queue in the same way as in FIG. 2. In step 3-2 the mobile station MS moves from cell C1 to cell C2. In step 3-3 the mobile station MS informs the network BSS about the location update by sending the UI frame number N2. In the BSS queue the UI frame N2 bypasses the I frame N1, which has a lower priority, and in step 3-4 the network BSS transmits the UI frame N2 to the SGSN node. As N2 is larger than the largest frame number N0 received by the SGSN node in step 3-5, the SGSN node concludes that the mobile station MS has moved to cell C2. In step 3-6 the network BSS transmits the I frame N1. In step 3-7, as N1 is smaller than the largest frame number N2 received by the SGSN node, the SGSN node ignores the location information included in message N1. In step 3-8 the SGSN node transmits data D addressed to the mobile station. The latest information the SGSN node has received about the location of the mobile station MS is based on the UI frame N2 received in step 3-4, indicating cell C2 as the location of the mobile station. The SGSN node thus concludes that the mobile station MS is in cell C2 and starts transmitting data to cell C2. As a result, prior art delays and unnecessary use of the network and the air interface resources can be avoided.

At the same time the invention solves a similar problem arising for example in the following situation. Let us assume that a mobile station MS has moved from cell C1 to cell C2. The ordinary I frames, which the mobile station MS has transmitted from the old cell C1, experience extraordinary delay on the route, and the I frames that have been transmitted from the new cell C2 will reach the SGSN node before the I frames transmitted from cell C1. When these frames finally reach the SGSN node, it incorrectly concludes that the mobile station has moved to cell C1.

The method of the invention can be physically implemented in such a manner that the network elements transmitting the frames F provide the frames with a consecutive number. The numbering of the frames F covers both I and UI frames. The network element maintaining location information of the mobile station, like an SGSN node, is provided with a functionality, which ignores the location information included in the frame, if the frame number is smaller than the number of a frame previously received and associated with the same connection. The invention does not require any alterations to the network hardware, and can be implemented in a reasonably simple manner as additions to the software of the network elements concerned.

An alternative to unambiguous frame numbering, is to use e.g. 8 or 16-bit frame numbers, whereby 256 or 65536 frames, respectively, could be indicated before restarting the numbering. In this case, if the frame numbers differ considerably in steps 3–5 or 3–7, the SGSN node concludes that the numbering has restarted between two roughly similar frame numbers being compared and adds the range of variation of the frame numbers, i.e. 256 or 65536, to the smaller number being compared. By restricting the number of bits used in frame numbers, the additional traffic caused by the frame numbers can be reduced.

In accordance with an embodiment of the invention, the mobile station MS attaches an ID to the frame only in connection with the location update (when the cell changes) and the base station subsystem BSS then attaches the IDs to the frame (for instance by repeating the same ID or by creating a hierarchical sub-ID), until the cell of the mobile station MS again changes and the mobile station creates and transmits the frame ID etc. Thus, use of the air interface capacity caused by the added IDs is minimized. Adding frame IDs can be stopped, when the time elapsed since the location update corresponds to the maximum propagation delay of the packet in the network.

The frame numbering of the invention can also be utilized in the following way. On the basis of the information received, the SGSN node detects that the cell of the mobile station MS has changed. The SGSN node storing data addressed to the old cell of the mobile station can direct the data to the new cell of the mobile station. Alternatively, the SGSN node can transmit an order to the route associated with the old cell of the mobile station that the data stored in the memory is to be addressed to the new cell of the mobile station, or is to be destroyed.

The invention has been explained in connection with a mobile communication system, but can be applied to other types of telecommunication systems. It is obvious to those skilled in the art that the basic idea of the invention can be implemented in many different ways. It is for instance not relevant that the frames are numbered with numbers, but any kind of identifiers indicating the sequence of the frames can be used. The invention and its embodiments are not restricted to the examples above but can be modified within the scope of the claims.

What is claimed is:

1. A method of transmitting a frame in a telecommunication system between a transmitter and a receiver, the frame including information about one of a location of the transmitter of the frame and a route used by the frame, and the frame belonging to one of at least two different frame types, the method comprising:
   providing the frame with a sequence identifier independent of the frame type in order to identify one of the frame, the transmitter and a following network element in a direction toward the receiver;
   at least one network element receiving the frame;
   observing the sequence identifier of the frame; and
   concluding that one of a location and a routing information included in the frame is incorrect if the sequence identifier of the frame shows that the frame is older than a frame received earlier by the at least one network element.

2. The method according to claim 1, further comprising adding the sequence identifier to the frame only when a location of the transmitter changes.

3. The method according to claim 1, further comprising adding the sequence identifier to the frame only when a route of the frame differs from a route of a previous frame.

4. The method according to claim 1, further comprising sequence identifiers being unambiguous for each connection.

5. The method according to claim 1, further comprising:
   a range of variation of sequence identifiers being smaller than a largest possible number of packets during a connection; and
   if the sequence identifiers differ from each other by an amount that is close to the range of variation of the sequence identifiers, a receiving network element concluding that creation of sequence identifiers has been restarted and performing a corresponding correction.

6. The method according to claim 1, further comprising the transmitter attaching sequence identifiers to the frame only when a location of the transmitter changes; and
   a network element following the transmitter in a direction toward the receiver attaching sequence identifiers to the frame, until a location of the transmitter changes again.

7. An arrangement for transmitting a frame between a transmitter and a receiver in a telecommunication system, the frame including information about one of a location of the transmitter of the frame and a route of the frame, and the frame belonging to one of at least two different types of frames, the arrangement comprising:
   means for providing the frame with a sequence identifier independent of the frame type, in order to identify one of the frame, the transmitter and a following network element in a direction toward the receiver; and
   at least one network element receiving the frame including means for observing the sequence identifier of the frame and for concluding that one of a location and a routing information included in the frame is incorrect if the sequence identifier of the frame shows that the frame is older than a frame received earlier by the at least one network element.

8. The method according to claim 2, further comprising sequence identifiers being unambiguous for each connection.

9. The method according to claim 3, further comprising sequence identifiers being unambiguous for each connection.

10. The method according to claim 2, further comprising:
    a range of variation of sequence identifiers being smaller than a largest possible number of packets during a connection; and
    if the sequence identifiers differ from each other by an amount that is close to the range of variation of the sequence identifiers, a receiving network element concluding that creation of sequence identifiers has been restarted and performing a corresponding correction.

11. The method according to claim 3, further comprising:
    a range of variation of sequence identifiers being smaller than a largest possible number of packets during a connection; and
    if the sequence identifiers differ from each other by an amount that is close to the range of variation of the sequence identifiers, a receiving network element concluding that creation of sequence identifiers has been restarted and performing a corresponding correction.

12. The method according to claim 2, further comprising the transmitter attaching sequence identifiers to the frame only when a location of the transmitter changes; and
    a network element following the transmitter in a direction toward the receiver attaching sequence identifiers to the frame, until a location of the transmitter changes again.

13. The method according to claim 3, further comprising the transmitter attaching sequence identifiers to the frame only when a location of the transmitter changes; and
    a network element following the transmitter in a direction toward the receiver attaching sequence identifiers to the frame, until a location of the transmitter changes again.

14. The method according to claim 4, further comprising the transmitter attaching sequence identifiers to the frame only when a location of the transmitter changes; and
    a network element following the transmitter in a direction toward the receiver attaching sequence identifiers to the frame, until a location of the transmitter changes again.

15. The method according to claim 5, further comprising the transmitter attaching sequence identifiers to the frame only when a location of the transmitter changes; and
    a network element following the transmitter in a direction toward the receiver attaching sequence identifiers to the frame, until a location of the transmitter changes again.

16. The arrangement according to claim 7, further comprising the transmitter attaching sequence identifiers to the frame only when a location of the transmitter changes; and
    a network element following the transmitter in a direction toward the receiver attaching sequence identifiers to the frame, until a location of the transmitter changes again.

17. The method according to claim 8, further comprising the transmitter attaching sequence identifiers to the frame only when a location of the transmitter changes; and
    a network element following the transmitter in a direction toward the receiver attaching sequence identifiers to the frame, until a location of the transmitter changes again.

18. The method according to claim 9, further comprising the transmitter attaching sequence identifiers to the frame only when a location of the transmitter changes; and a network element following the transmitter in a direction toward the receiver attaching sequence identifiers to the frame, until a location of the transmitter changes again.

19. The method according to claim 10, further comprising the transmitter attaching sequence identifiers to the frame only when a location of the transmitter changes; and a network element following the transmitter in a direction toward the receiver attaching sequence identifiers to the frame, until a location of the transmitter changes again.

20. The method according to claim 11, further comprising the transmitter attaching sequence identifiers to the frame only when a location of the transmitter changes; and a network element following the transmitter in a direction toward the receiver attaching sequence identifiers to the frame, until a location of the transmitter changes again.

* * * * *

UNITED STATES PATENT AND TRADEMARK OFFICE
CERTIFICATE OF CORRECTION

PATENT NO.     : 6,563,825 B1
DATED          : May 13, 2003
INVENTOR(S)    : Hannu Kari and Sami Huusko It is certified that error appears in the above-identified patent and that said Letters Patent is hereby corrected as shown below:

Title page,
Item [75], Inventor, please add -- Sami Huusko, Espoo (FI) --.

Signed and Sealed this

Sixth Day of September, 2005

JON W. DUDAS
*Director of the United States Patent and Trademark Office*